(12) United States Patent
Sliwinski et al.

(10) Patent No.: US 6,454,848 B2
(45) Date of Patent: *Sep. 24, 2002

(54) INFRARED REFLECTIVE COLOR PIGMENT

(75) Inventors: Terrence R. Sliwinski, Brookpark;
Richard A. Pipoly, Garfield Heights;
Robert P. Blonski, North Royalton, all of OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,291

(22) Filed: Dec. 20, 2000

Related U.S. Application Data (63) Continuation-in-part of application No. 09/178,957, filed on Oct. 26, 1998, now Pat. No. 6,174,360.

(51) Int. Cl.⁷ .............................. C09C 1/00; C09C 1/34
(52) U.S. Cl. ................ 106/459; 106/286.2; 106/286.3; 106/425; 106/439; 106/441; 106/450; 106/453; 106/712; 252/587
(58) Field of Search ................... 106/453, 439, 106/425, 441, 450, 459, 286.2, 286.3, 712; 252/587

(56) References Cited

U.S. PATENT DOCUMENTS

| | | | | |
|---|---|---|---|---|
| 3,022,186 A | * | 2/1962 | Hund | 106/401 |
| 3,091,544 A | * | 5/1963 | Hund | 106/426 |
| 4,052,225 A | * | 10/1977 | Mansmann et al. | 106/454 |
| 4,067,747 A | * | 1/1978 | Mansmann et al. | 106/453 |
| 4,145,229 A | * | 3/1979 | Ferrero et al. | 106/457 |
| 4,285,726 A | * | 8/1981 | Hund et al. | 106/14.05 |
| 4,289,677 A | * | 9/1981 | Supcoe et al. | 260/33.6 SB |
| 4,495,239 A | * | 1/1985 | Pusch et al. | 428/192 |
| 4,624,710 A | * | 11/1986 | Modly | 106/286.2 |
| 4,844,741 A | * | 7/1989 | Knittel et al. | 106/436 |
| 4,892,906 A | * | 1/1990 | Pham et al. | 524/730 |
| 4,916,014 A | * | 4/1990 | Weber et al. | 428/403 |
| 4,957,562 A | * | 9/1990 | Rademachers et al. | 106/453 |
| 5,150,199 A | * | 9/1992 | Shoemaker et al. | 345/603 |
| 5,167,708 A | * | 12/1992 | Wilhelm et al. | 106/441 |
| 5,228,910 A | * | 7/1993 | Joyce et al. | 106/450 |
| 5,256,611 A | * | 10/1993 | Moltgen et al. | 106/450 |
| 5,501,733 A | * | 3/1996 | Macaudiere et al. | 106/400 |
| 5,691,410 A | * | 11/1997 | Escarsega et al. | 524/425 |
| 5,817,583 A | * | 10/1998 | Alderson et al. | 428/919 |
| 5,962,143 A | * | 10/1999 | Krauthauser et al. | 428/425.1 |
| 6,174,360 B1 | * | 1/2001 | Sliwinski et al. | 106/286.2 |

* cited by examiner

Primary Examiner—Anthony Green (57) ABSTRACT

The present invention provides new solid solutions having a corundum-hematite crystalline structure which are useful as inorganic color pigments. Solid solutions according to the present invention include a host component having a corundum-hematite crystalline structure which contains as guest components one or more elements from the group consisting of aluminum, antimony, bismuth, boron, chrome, cobalt, gallium, indium, iron, lanthanum, lithium, magnesium, manganese, molybdenum, neodymium, nickel, niobium, silicon, tin, titanium, vanadium, and zinc. Solid solutions according to the present invention are formed by thoroughly mixing compounds, usually metal oxides or precursors thereof, which contain the host and guest components and then calcining the compounds to form the solid solutions having the corundum-hematite crystalline structure. Some of the new solid solutions according to the present invention exhibit relatively low Y CIE tri-stimulus values and relatively high near infrared reflectance.

23 Claims, 4 Drawing Sheets

INFRARED REFLECTIVE COLOR PIGMENT

REFERENCE TO PRIOR APPLICATION

This is a continuation-in-part of application Ser. No. 09/178,957, filed Oct. 26, 1998, now U.S. Pat. No. 6,174,360.

FIELD OF INVENTION

The present invention concerns new solid solutions which are useful as inorganic color pigments. More particularly, the present invention concerns new solid solutions having a corundum-hematite crystalline structure which are useful as inorganic color pigments, some of which exhibit low Y CIE tri-stimulus values and high reflectivity in the near infrared portion of the electromagnetic spectrum.

BACKGROUND OF THE INVENTION

Chromium green-black hematite (basic chemical formula: $Cr_2O_3$) is an inorganic color pigment, C.I. Pigment Green 17, having a corundum-hematite crystalline structure. It is commonly used to impart a green color to ceramics, paints, polymers, and other materials. The DCMA Classification and Chemical Description of the Complex Inorganic Color Pigments, Third Addition (1991), published by the Dry Color Manufacturer's Association, states that its composition may include any one or a combination of the modifiers $Al_2O_3$ (alumina), $Fe_2O_3$(iron oxide), or $Mn_2O_3$(manganese oxide).

Iron brown hematite (basic chemical formula: $Fe_2O_3$), is an inorganic pigment, C.I. Pigment Red 101 & 102, having a dark brown to black color and a corundum-hematite crystalline structure. See DCMA Classification and Chemical Description of the Complex Inorganic Color Pigments, Third Addition (1991). It is commonly used to impart dark brown to black color to ceramics, paints, plastics, and other material. Its composition may include any one or a combination of the modifiers $Cr_2O_3$(chrome oxide), $Fe_2O_3$(iron oxide), $Mn_2O_3$(manganese oxide), or NiO (nickel oxide).

Chromium green-black hematite is one of the principle pigments used in the manufacture of green shade military camouflage paint and netting. In such applications, chromium green-black hematite is combined with cobalt bearing mixed metal oxides, such as cobalt containing spinel pigment V12600 available from Ferro Corporation of Cleveland, Ohio. This combination of pigments is effective in simulating the reflectivity of chlorophyl in the visible portion of the electromagnetic spectrum, being that portion of the spectrum which is viewable by the naked eye with wavelengths ranging from approximately 0.40 $\mu$m to 0.70 $\mu$m.

Chlorophyl, which is an organic pigment, generally exhibits a relatively uniform high degree of reflectivity in the near infrared, being that portion of the electromagnetic spectrum with wavelengths ranging from approximately 0.7 $\mu$m, to 2.5 $\mu$m. Cobalt, however, exhibits a strong absorption band (i.e., low reflectivity) in a portion of the near infrared with wavelengths ranging from approximately 1.2 $\mu$m to 1.6 $\mu$m. In recent years, advancements in imaging technology have made it possible to contrast known military green shade camouflage painted or covered objects from the background foliage in that portion of the near infrared. A substitute military green shade camouflage pigment which contains no cobalt and which closely matches the reflectivity of chlorophyl in the visible and near infrared is therefore highly desired.

In order to satisfy military specifications, a substitute green shade camouflage pigment would have to exhibit a dark drab green appearance in the visible portion of the spectrum and would also have to simulate the reflectance curve for chlorophyl in the near infrared. Generally speaking, known inorganic pigments which exhibit a low degree of reflectivity in the visible portion of the light spectrum (i.e., dark drab colored pigments) also tend to exhibit a correspondingly low degree of reflectivity (i.e., high absorption) in other portions of the light spectrum, including the near infrared. A chromium green-black hematite pigment manufactured by Bayer Corporation of Germany, product number AC 5303, was observed to exhibit a higher near infrared reflectance than other chromium green-black hematite sources (this pigment, however, does not have the desired dark drab appearance in the visible spectrum required for military green shade camouflage paint applications). It was found by chemical analysis that this pigment contained both alumina and titania (basic chemical formula: $TiO_2$) as minor additives. A search failed to disclose any references teaching the use of alumina and titania to improve the near infrared reflectance of chromium green-black hematite pigments.

SUMMARY OF INVENTION

The present invention provides new solid solutions having a corundum-hematite crystalline structure which are useful as inorganic color pigments. Solid solutions according to the present invention are comprised of a host component having a corundum-hematite crystalline structure which contains as a guest component one or more elements from the group consisting of aluminum, antimony, bismuth, boron, chrome, cobalt, gallium, indium, iron, lanthanum, lithium, magnesium, manganese, molybdenum, neodymium, nickel, niobium, silicon, tin, titanium, vanadium, and zinc. Solid solutions according to the present invention are formed by thoroughly mixing compounds, usually metal oxides or precursors thereof, which contain the host and guest components and then calcining the compounds to form the solid solutions having the corundum-hematite crystalline structure.

Some of the new solid solutions according to the present invention, such as for example chrome oxide as a host component containing the elements iron, boron, and titanium as guest components, exhibit dark drab colors in the visible and high reflectivity in the near infrared portions of the electromagnetic spectrum. One of the primary uses for new solid solutions having these properties would be as inorganic color pigments in military camouflage paint or netting applications, which would permit the radiation signature of a painted or covered object to be tailored to match the reflectance curve of the background foliage in the visible and near infrared portions of the electromagnetic spectrum. Because many of these new solid solutions exhibit relatively high near infrared reflectance, they would also be suitable for use in the general paint and polymer markets, most specifically for architectural applications where increased near infrared reflectance would result in lower heat build-up and thus lower energy costs.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

In accordance with the present invention, solid solutions having a corundum-hematite crystalline structure can be obtained by using metal oxides, or precursors thereof, which form corundum-hematite lattices as host components and incorporating into them as guest components such metal oxides, or precursors thereof, the cations of which possess radii which are comparable with the radii of the metal ions, or the statistical mean of the radii of the metal ions of the host components. The guest components are incorporated in such proportions relative to one another that the ratio of the sum of the added cations to the sum of the added anions, while preserving statistical electro-neutrality in the lattice, is substantially 2:3. The total proportion of the guest components may be of any value, but the amount is preferably not greater than approximately the total amount of the host components. Conceptually, these additions can be considered in a manner similar to the Hund crystalline solid solution patents, U.S. Pat. Nos. 3,022,186, 3,091,544, and 4,285,726, the specifications of which are hereby incorporated by reference. Essentially, guest components or dopants can be added to the host component or crystalline lattice as long as the crystalline structure, charge, and cation sites of the host component are substantially conserved.

Table 1 below sets forth some of the various compounds which have a corundum-hematite crystalline structure and comparable lattice constant ranges so as to be capable of forming solid solutions according to the present invention:

TABLE 1

Representative Corundum-Hematite Crystalline Lattice Constants

| Formula | A | C | JCPDS Card Number |
|---|---|---|---|
| $Cr_2O_3$ | 4.958 Å | 13.593 Å | 38-1479 |
| $Al_2O_3$ | 4.758 Å | 12.991 Å | 10-173 |
| $V_2O_3$ | 4.920 Å | 13.883 Å | 34-187 |
| $Ga_2O_3$ | 4.979 Å | 13.429 Å | 6-503 |
| $Fe_2O_3$ | 5.036 Å | 13.749 Å | 33-664 |
| $Mn_2O_3$ | 5.04 Å | 14.12 Å | 33-900 |
| $Ti_2O_3$ | 5.139 Å | 13.659 Å | 10-63 |
| $In_2O_3$ | 5.49 Å | 14.52 Å | 22-336 |
| $TiBO_3$ | 4.67 Å | 14.90 Å | 17-310 |
| $NiTiO_3$ | 5.032 Å | 13.791 Å | 33-961 |
| $MgTiO_3$ | 5.054 Å | 13.898 Å | 6-494 |
| $CoTiO_3$ | 5.068 Å | 13.922 Å | 15-866 |
| $ZnTiO_3$ | 5.078 Å | 13.927 Å | 25-1500 |

TABLE 1-continued

Representative Corundum-Hematite Crystalline Lattice Constants

| Formula | A | C | JCPDS Card Number |
|---|---|---|---|
| $FeTiO_3$ | 5.088 Å | 14.093 Å | 29-733 |
| $MnTiO_3$ | 5.140 Å | 14.290 Å | 29-902 |
| $CrBO_3$ | 4.578 Å | 14.260 Å | 15-663 |
| $NiCrO_3$ | 4.925 Å | 13.504 Å | 22-748 |
| $FeBO_3$ | 4.613 Å | 14.470 Å | 21-423 |
| $FeMoO_3$ | 4.67 Å | 15.03 Å | 19-611 |
| $FeSn(BO_3)_2$ | 4.733 Å | 15.08 Å | 18-657 |
| $BiFeO_3$ | 5.57 Å | 13.84 Å | 20-169 |
| $AlBO_3$ | 4.463 Å | 13.746 Å | 32-4 |
| $Mg_3Al_2Si_3O_{12}$ | 4.755 Å | 13.360 Å | 30-788 |
| $NdAlO_3$ | 5.326 Å | 12.920 Å | 29-57 |
| $LaAlO_3$ | 5.344 Å | 13.110 Å | 31-22 |
| $MnSnO_3$ | 5.358 Å | 14.505 Å | 33-913 |
| $LiNbO_3$ | 5.149 Å | 13.862 Å | 20-631 |
| $LaCoO_3$ | 5.441 Å | 13.088 Å | 25-1060 |
| $MgSiO_3$ | 4.725 Å | 13.563 Å | 39-300 |
| $ZnSiO_3$ | 4.746 Å | 13.755 Å | 34-575 |
| $Mn(Sb,Fe)O_3$ | 5.226 Å | 14.325 Å | 20-699 |

It should be noted that Table 1 does not contain all of the possible compounds that can form solid solutions according to the present invention. For example, molybdenum can be incorporated as a guest component into a chrome oxide host according to the present invention. One would reasonably expect that since iron and chrome have lattice constants which are very close, and both form extensive solid solutions, $CrMoO_3$ would exist and be similar in crystal structure to $FeMoO_3$, although $CrMoO_3$ is not shown in Table 1. Solid solutions according to the present invention, irrespective of whether shown on Table 1, are comprised of a host component having a corundum-hematite crystalline structure which contain as a guest component one or more elements from the group consisting of aluminum, antimony, bismuth, boron, chrome, cobalt, gallium, indium, iron, lanthanum, lithium, magnesium, manganese, molybdenum, neodymium, nickel, niobium, silicon, tin, titanium, vanadium, and zinc.

Solid solutions according to the present invention are prepared by thoroughly dry or wet mixing compounds containing the host and guest components and then calcining the components to form a solid solution. Generally, the host and guest components will both comprise metal oxides. However, precursors thereof, meaning compounds which at the calcining temperature are converted in the presence of an oxidizing atmosphere into metal oxides can also be used. Such precursors include, for example: aluminum hydrate (basic chemical formula: $Al(OH)_3$)) which can be used as a precursor for aluminum oxide; manganese carbonate (basic chemical formula: $MnCO_3$) which can be used as a precursor for manganese sesquioxide (basic chemical formula: $Mn_2O_3$); and indium hydroxide (basic chemical formula: $In(OH)_3$) which can be used as a precursor for indium oxide (basic chemical formula: $In_2O_3$). It will be appreciated that a wide variety of precursors can be used to practice the invention, and that the selection of precursors is not per se critical.

The host and guest components are preferably milled to a fine powder and then thoroughly mixed in the appropriate proportions. Milling fineness is not critical, but average particle size diameters from approximately 0.2 μm to about 5 μm are preferred. Standard pigment grade metal oxide powders and precursors currently available on the market can generally be used without additional milling prior to mixing. Mixing can occur in a dry state, or the powders can be mixed in solution, dried, and then milled again if necessary to break up any particle agglomerations. The mixture is then calcined to form crystalline solid solutions. Calcination can be achieved in a standard refractory sagger, kiln, or other suitable device to form the solid solutions. Calcination can also be achieved through the use of a rotary calciner. Calcination sufficient to form solid solutions generally occurs at a temperature of from about 1,750° F. to about 2,250° F. for about 0.5 to about 24 hours. However, it will be understood to those practicing the invention that a wide range of calcination temperatures and times can be used, and that so long as the temperature and length of time used is sufficient to form the solid solutions according to the present invention, the temperature and length of time of calcination is not per se critical.

In most instances, it is unnecessary to mill or grind solid solutions formed according to the present invention after calcination. However, when a smaller average particle size is desired or when a particular application requires a strict avoidance of minor particle agglomerations, additional milling or grinding of the solid solutions can be performed.

It should be apparent to those skilled in the art that the method of the present invention can be practiced to manufacture a wide variety of solid solutions having utility as inorganic pigments for use in ceramics, polymers, paints, and other materials. The selection of guest and host components used to form solid solutions can readily be made within the total specification disclosure. In similar fashion, it is to be appreciated that the process steps of the method, including mixing, calcination, and product recovery, are generally conventional and thus can be readily determined by those skilled in the art.

The following examples are intended to illustrate the invention without limiting it in any way. All raw materials referenced in the examples are standard pigment grade powders unless otherwise indicated.

EXAMPLE 1

93.46 grams chrome oxide, 0.94 grams iron oxide, 2.38 grams aluminum oxide from aluminum hydrate and 1.88 grams titanium dioxide were thoroughly mixed in a Waring blender and calcined in a crucible at 2,000° F. for three hours.

EXAMPLE 2

93.02 grams chrome oxide, 0.93 grams iron oxide, 3.35 grams aluminum oxide from aluminum hydrate and 0.83 grams titanium dioxide were thoroughly mixed in a Waring blender and calcined in a crucible at 2,000° F. for three hours.

EXAMPLE 3

93.23 grams chrome oxide, 0.92 grams iron oxide, 0.43 grams molybdenum trioxide (basic chemical formula: $MoO_3$), 3.11 grams aluminum oxide from aluminum hydrate and 0.57 grams titanium dioxide were thoroughly mixed in a Waring blender and calcined in a crucible at 2,000° F. for three hours.

EXAMPLE 4

95.49 grams chrome oxide, 0.96 grams iron oxide, 1.63 grams boron oxide (basic chemical formula: $B_2O_3$) and 1.92 grams titanium dioxide were thoroughly mixed in a Waring blender and calcined in a crucible at 2,000° F. for three hours.

EXAMPLE 5

86.79 grams chrome oxide, 0.96 grams iron oxide, 10.59 grams bismuth trioxide (basic chemical formula: $B_2O_3$) and 1.75 grams titanium dioxide were thoroughly mixed in a Waring blender and calcined in a crucible at 2,000° F. for three hours.

EXAMPLE 6

91.86 grams chrome oxide, 0.92 grams iron oxide, 2.42 grams aluminum oxide from aluminum hydrate and 3.56 grams tin oxide (basic chemical formula: SnO) were thoroughly mixed in a Waring blender and calcined in a crucible at 2,000° F. for three hours.

EXAMPLE 7

93.87 grams chrome oxide, 0.94 grams iron oxide, 2.39 grams aluminum oxide from aluminum hydrate and 1.45 grams silicon dioxide (basic chemical formula: $SiO_2$) were thoroughly mixed in a Waring blender and calcined in a crucible at 2,000° F. for three hours.

EXAMPLE 8

93.05 grams chrome oxide, 0.93 grams manganese sesquioxide from manganese carbonate, 2.68 grams aluminum oxide from aluminum hydrate and 1.39 grams titanium dioxide were thoroughly mixed in a Waring blender and calcined in a id crucible at 2,000° F. for three hours.

EXAMPLE 9

89.96 grams chrome oxide, 0.90 grams iron oxide, 6.13 grams indium oxide from indium hydroxide and 1.81 grams titanium dioxide were thoroughly mixed in a Waring blender and calcined in a crucible at 2,000° F. for three hours.

EXAMPLE 10

90.06 grams chrome oxide, 0.91 grams iron oxide, 7.22 grams lanthanum oxide (basic chemical formula: $La_2O_3$) and 1.81 grams titanium dioxide were thoroughly mixed in a Waring blender and calcined in a crucible at 2,000° F. for three hours.

EXAMPLE 11

89.85 grams chrome oxide, 0.90 grams iron oxide, 7.44 grams neodymium oxide (basic chemical formula: $Nd_2(SO_4)_3$) and 1.81 grams titanium dioxide were thoroughly mixed in a Waring blender and calcined in a crucible at 2,000° F. for three hours.

EXAMPLE 12

95.08 grams chrome oxide, 0.96 grams iron oxide, 2.50 grams aluminum oxide from aluminum hydrate and 0.06 grams titanium dioxide were thoroughly mixed in a Waring blender and calcined in a crucible at 2,000° F. for three hours.

EXAMPLE 13

79.36 grams chrome oxide, 0.80 grams iron oxide, 9.98 grams aluminum oxide from aluminum hydrate and 4.27 grams titanium dioxide were thoroughly mixed in a Waring blender and calcined in a crucible at 2,000° F. for three hours.

EXAMPLE 14

99.06 grams chrome oxide and 0.94 grams iron oxide were thoroughly mixed in a Waring blender and calcined in a crucible at 2,000° F. for three hours.

EXAMPLE 15

93.15 grams chrome oxide, 0.88 grams iron oxide, 3.06 grams aluminum oxide from aluminum hydrate and 1.19 grams titanium dioxide were thoroughly mixed in a Waring blender and calcined in a crucible at 1,850° F. for three hours.

EXAMPLE 16

48.46 grams chrome oxide, 48.46 grams iron oxide, 1.58 grams aluminum oxide from aluminum hydrate and 0.61 grams titanium dioxide were thoroughly mixed in a Waring blender and calcined in a crucible at 1,850° F. for three hours.

Figure 1:
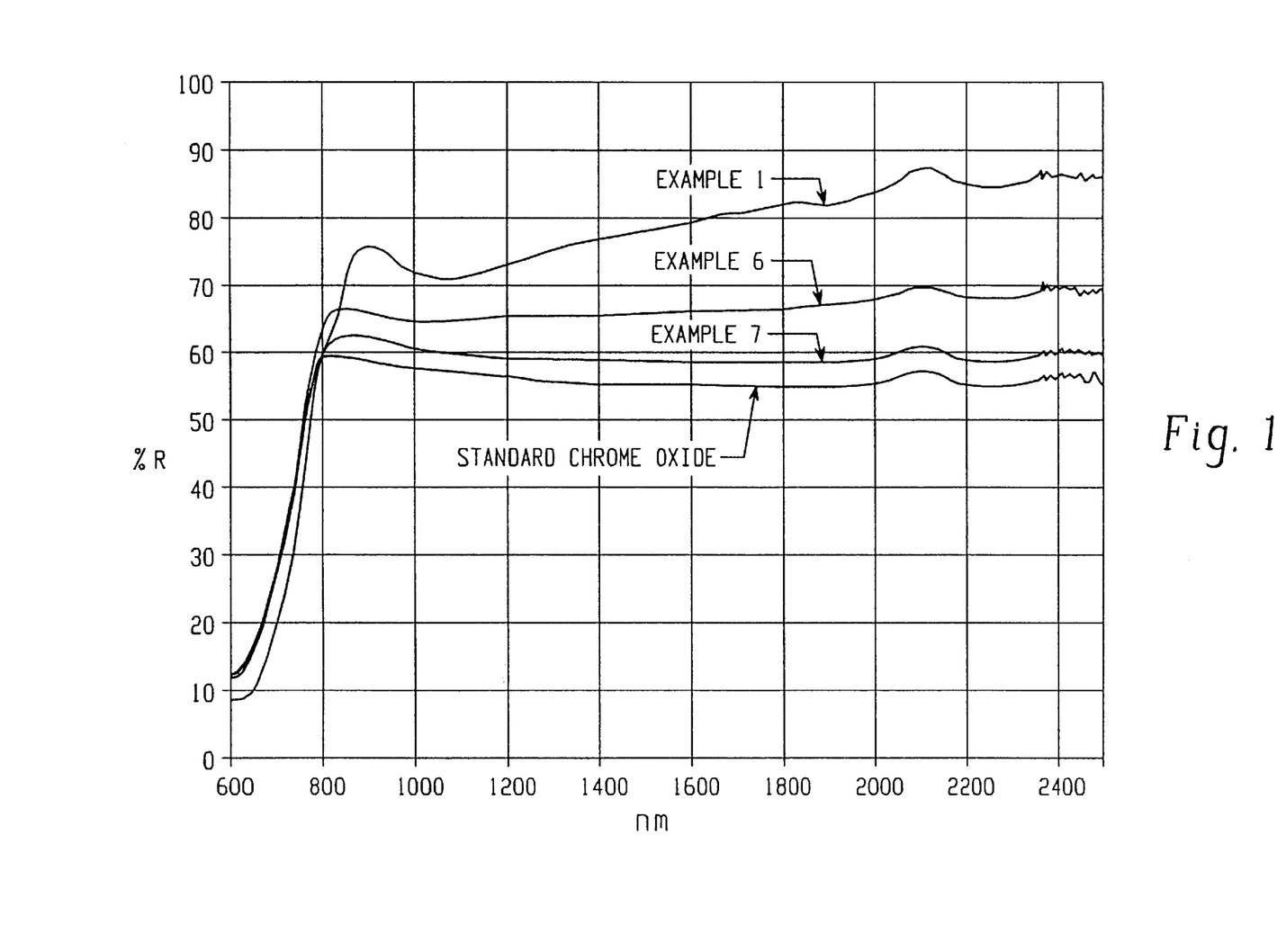
FIG. 1 is a graph showing percent reflectance at wavelengths ranging from 0.6 $\mu$m to 2.5 $\mu$m for the infrared reflective color pigments embodied in Examples 1, 6, and 7 herein as compared to a standard chromium green-black hematite pigment.

FIG. 1 is a graph showing percent reflectance at wavelengths ranging from 0.6 μm to 2.5 μm for infrared reflective color pigments prepared as described in Examples 1, 6, and 7 above as compared to a standard chromium green-black hematite pigment available as G-4099 from Elementis Pigments, Inc. of Fairview Heights, Ill. Percent reflectance measurements were made on neat pressed cup powder samples using a Perkin Lambda 19 Spectrophotometer equipped with a Labsphere RSA-PE-19 reflectance spectroscopy accessory. FIG. 1 shows that some of the infrared reflective color pigments according to the present invention exhibit significantly higher near infrared reflectance than known chromium green-black hematite pigments. FIG. 1 also shows that elements such as silicon and tin can be substituted for titanium in the crystal lattice structure of pigments according to the present invention.

Figure 2:
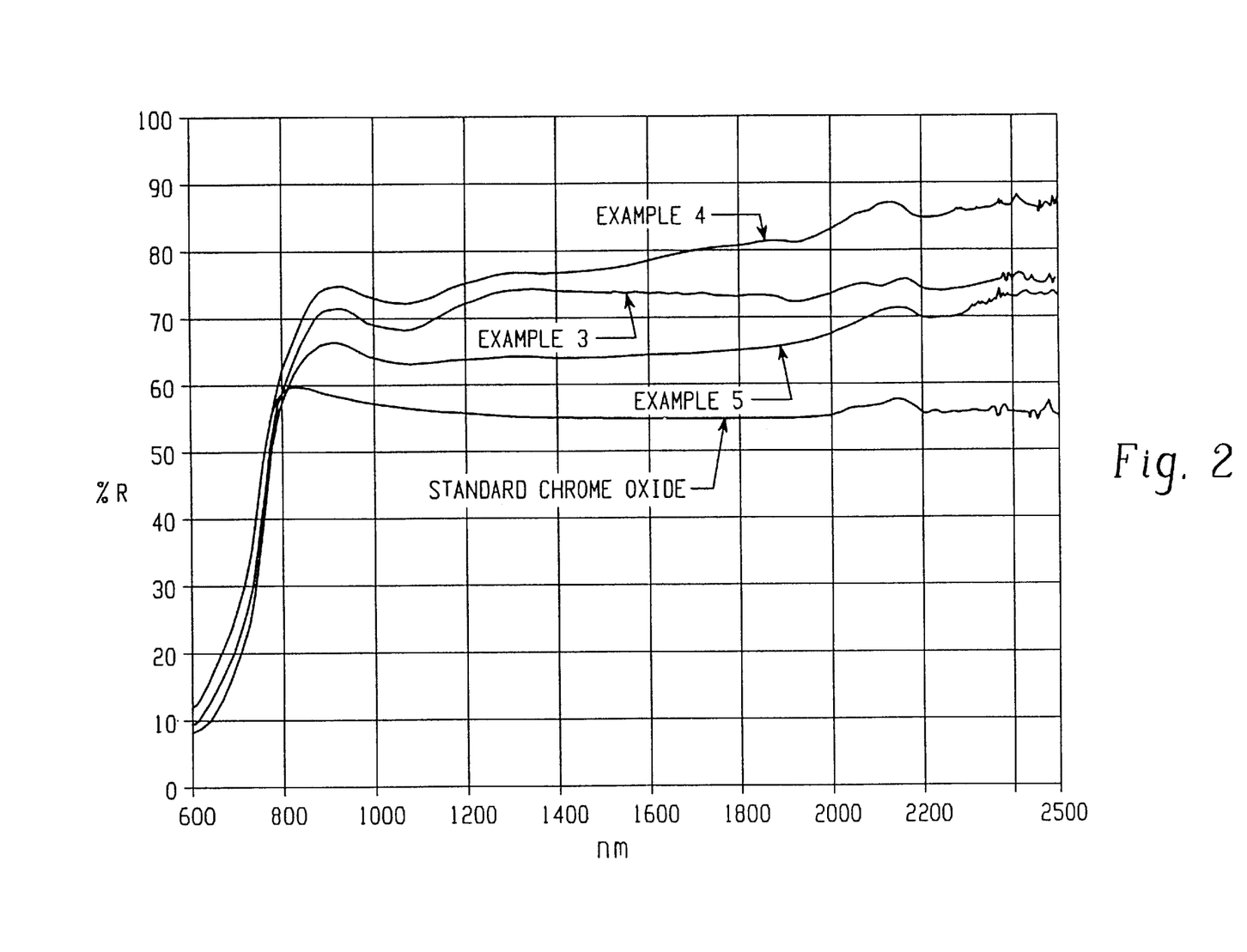
FIG. 2 is a graph showing percent reflectance at wavelengths ranging from 0.6 μm to 2.5 μm for the infrared reflective color pigments embodied in Examples 3, 4, and 5 herein as compared to a standard chromium green-black hematite pigment.

FIG. 2 is a graph showing percent reflectance at wavelengths ranging from 0.6 μm to 2.5 μm for infrared reflective color pigments prepared as described in Examples 3, 4, and 5 above as compared a standard chromium green-black hematite pigment available as G-4099 from Elementis Pigments, Inc. of Fairview Heights, Ill. Percent reflectance measurements were made on neat pressed cup powder samples using a Perkin Lambda 19 Spectrophotometer equipped with a Labsphere RSA-PE-19 reflectance spectroscopy accessory. FIG. 2 shows that elements such as bismuth, boron, and molybdenum can be substituted for the aluminum cation in the crystal lattice structure of pigments according to the present invention, allowing for adjustments of the visible color while retaining the preferable high near infrared reflectance.

Figure 3:
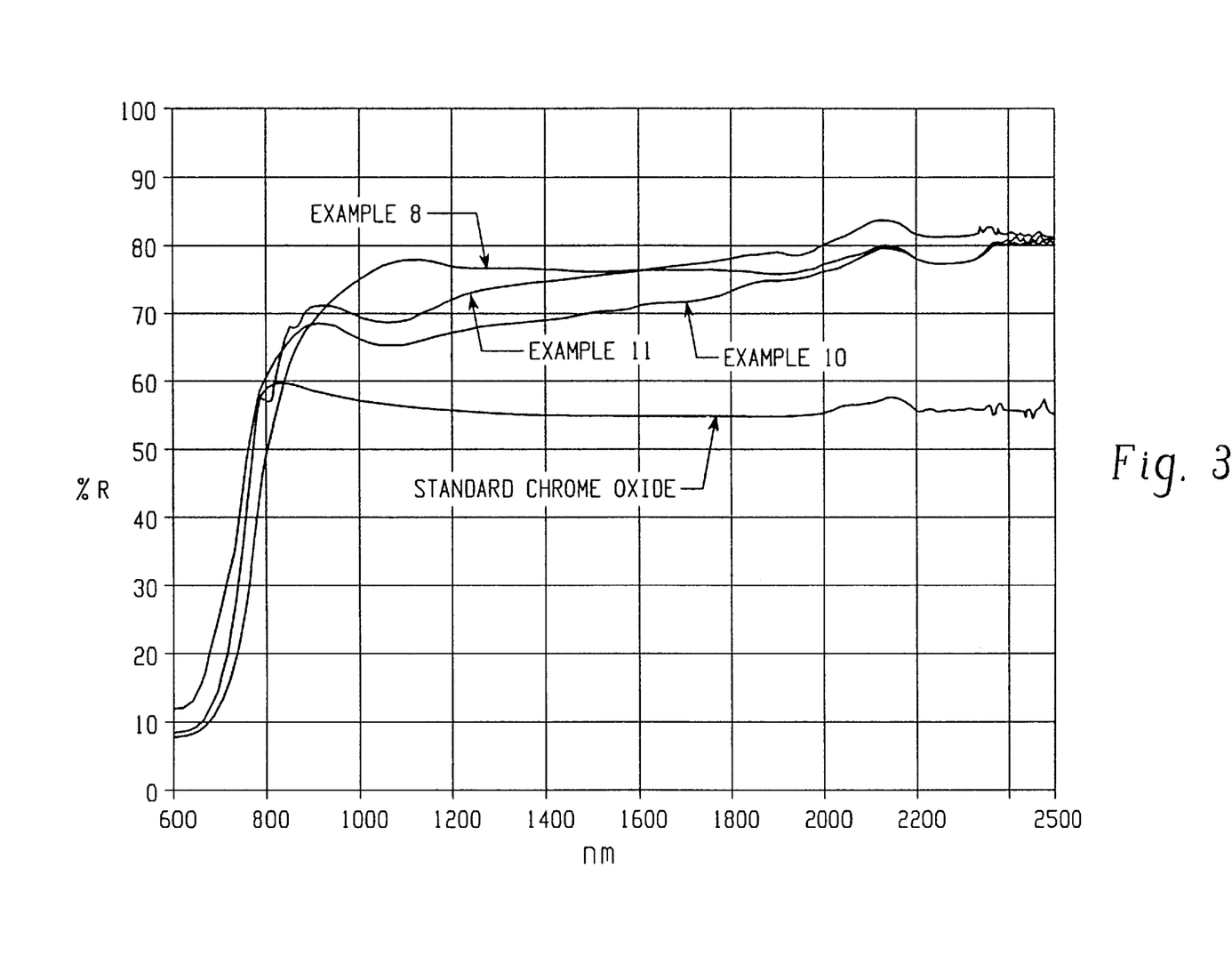
FIG. 3 is a graph showing percent reflectance at wavelengths ranging from 0.6 μm to 2.5 μm for the infrared reflective color pigments embodied in Examples 8, 10, and 11 herein as compared to a standard chromium green-black hematite pigment.

FIG. 3 is a graph showing percent reflectance at wavelengths ranging from 0.6 μm to 2.5 μm for infrared reflective color pigments prepared as described in Examples 8, 10, and 11 above as compared to a standard chromium green-black hematite pigment available as G-4099 from Elementis Pigments, Inc. of Fairview Heights, Ill. Percent reflectance measurements were made on neat pressed cup powder samples using a Perkin Lambda 19 Spectrophotometer equipped with a Labsphere RSA-PE-19 reflectance spectroscopy accessory. FIG. 3 shows that elements such as manganese, lanthanum, and neodymium can be substituted for the iron or aluminum cations in the crystal lattice structure of pigments according to the present invention, allowing for adjustments of the visible color while retaining the preferable high near infrared reflectance. By adjusting the quantity and identity of the combinations of cations in crystalline lattice structure in pigments according to the present invention, a wide range of colors can be produced.

Figure 4:
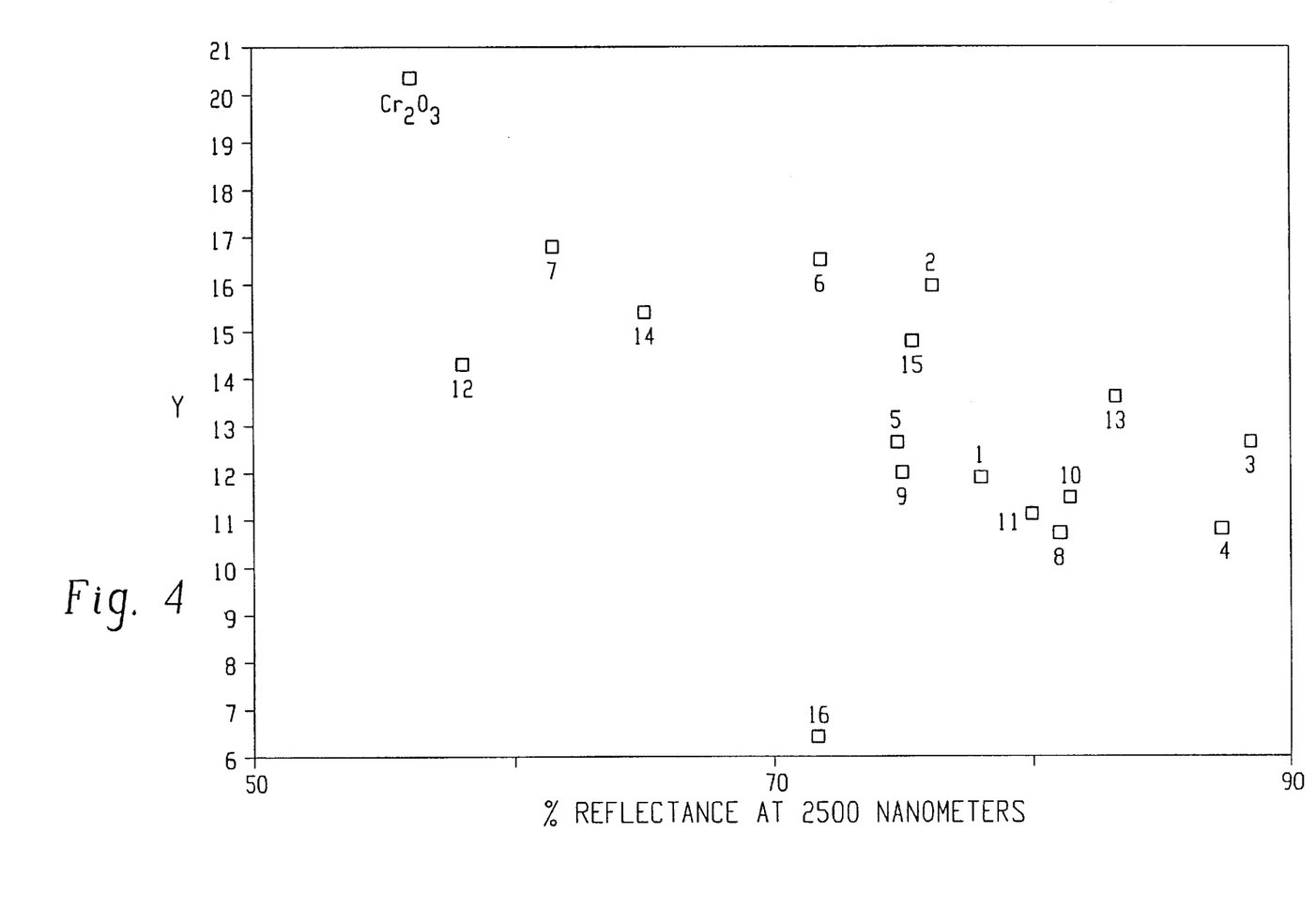
FIG. 4 is a graph showing Y CIE tri-stimulus values and percent reflectance as measured at a wavelength of 2.5 μm for the infrared reflective color pigments embodied in Examples 1 through 16 herein as compared to a standard chromium green-black hematite pigment.

FIG. 4 is a graph showing Y CIE tri-stimulus values versus percent reflectance measured at a wavelength of 2.5 μm for the infrared reflective color pigments prepared as described in Examples 1 through 16 above as compared to a standard chromium green-black hematite pigment available as G-4099 from Elementis Pigments, Inc. of Fairview Heights, Ill. Y CIE tri-stimulus values were measured on neat pressed cup powder samples using a Diano Matchscan II Spectrophotometer using a 1931 CIE 2 degree observer with a C Illuminant in accordance with the procedures set forth in ASTM Standard E308 (1996), Standard Practice for Computing the Colors of Objects by Using the CIE System, the text of which can be purchased from the American Society for Testing and Materials of West Conshohocken, Penn. Percent reflectance measurements were made on neat pressed cup powder samples using a Perkin Lambda 19 Spectrophotometer equipped with a Labsphere RSA-PE-19 reflectance spectroscopy accessory. FIG. 4 shows that some of the new solid solutions according to the present invention, such as those embodied in Examples 1, 3, 4, 8, 10, 11, 13, and 16, exhibit relatively low Y CIE tri-stimulus values (13.53 or less) and relatively high near infrared reflectance at 2.5 μm (71.7% or higher). Generally speaking, the Y CIE tri-stimulus value refers to the lightness or darkness of a color, with a lower Y CIE tri-stimulus value correlating with a darker color.

Table 2 below lists the Y CIE tri-stimulus values, x and y CIE chromaticity coordinates, and percent reflectance at various wavelengths in the near infrared spectrum for the solid solutions embodied in Examples 1 through 16 as compared to a standard chromium green-black hematite pigment available as G-4099 from Elementis Pigments, Inc. of Fairview Heights, Ill. Y CIE tri-stimulus values and x and y CIE chromaticity coordinates were measured on neat pressed cup powder samples using a Diano Matchscan II Spectrophotometer using a 1931 CIE 2 degree observer with a C Illuminant in accordance with the procedures set forth in ASTM Standard E308 (1996), Standard Practice for Computing the Colors of Objects by Using the CIE System, the text of which can be purchased from the American Society for Testing and Materials of shohocken, Penn. Percent reflectance measurements were made on sed cup powder samples using a Perkin Lambda 19 Spectrophotometer with a Labsphere RSA-PE-19 reflectance spectroscopy accessory.

TABLE 2

Color and % IR Reflectance (Pressed Cups)

| Example | Y | x | y | 0.72 μm | 0.80 μm | 0.90 μm | 1.0 μm | 1.5 μm | 2.5 μm |
|---|---|---|---|---|---|---|---|---|---|
| Standard | 20.33 | .315 | .409 | 35.0 | 59.6 | 58.9 | 57.4 | 55.0 | 56.0 |
| 1 | 11.91 | .328 | .378 | 25.0 | 57.0 | 67.8 | 66.2 | 72.0 | 78.0 |
| 2 | 15.99 | .331 | .406 | 24.2 | 59.6 | 71.3 | 69.0 | 73.9 | 76.3 |
| 3 | 12.61 | .333 | .391 | 28.6 | 66.5 | 79.1 | 76.2 | 84.2 | 88.5 |
| 4 | 10.77 | .323 | .372 | 23.8 | 62.2 | 74.8 | 73.0 | 77.4 | 87.3 |
| 5 | 12.64 | .332 | .386 | 27.0 | 59.3 | 66.2 | 64.3 | 64.3 | 74.8 |
| 6 | 16.53 | .326 | .399 | 33.3 | 63.1 | 67.2 | 66.0 | 67.7 | 71.9 |
| 7 | 16.81 | .326 | .402 | 32.8 | 59.0 | 61.9 | 60.6 | 59.4 | 61.5 |
| 8 | 10.71 | .321 | .374 | 21.5 | 50.5 | 68.3 | 74.8 | 76.0 | 81.0 |
| 9 | 12.04 | .331 | .379 | 25.5 | 57.2 | 63.8 | 61.1 | 60.9 | 75.0 |
| 10 | 11.50 | .330 | .376 | 25.2 | 60.0 | 68.0 | 66.2 | 70.0 | 81.4 |
| 11 | 11.10 | .326 | .368 | 24.0 | 58.1 | 70.0 | 69.2 | 75.2 | 80.0 |
| 12 | 14.28 | .330 | .405 | 29.7 | 56.1 | 59.5 | 58.1 | 57.0 | 58.0 |
| 13 | 13.53 | .334 | .398 | 31.6 | 64.1 | 72.7 | 70.0 | 71.2 | 83.2 |
| 14 | 15.35 | .334 | .408 | 27.4 | 59.2 | 62.1 | 61.0 | 60.0 | 65.0 |
| 15 | 14.82 | .330 | .403 | 30.6 | 60.1 | 67.2 | 65.5 | 69.9 | 75.4 |
| 16 | 6.43 | .328 | .325 | 11.6 | 22.1 | 34.5 | 37.0 | 63.6 | 71.7 |

EXAMPLE 17

36.14 grams chrome oxide, 60.32 grams iron oxide, 1.61 grams of aluminum oxide from aluminum hydrate, 0.62 grams titanium dioxide and 0.40 grams molybdic oxide were thoroughly mixed in a Waring blender and calcined at 1750° F. for seven hours.

EXAMPLE 18

32.32 grams chrome oxide, 64.48 grams iron oxide, 1.44 grams of aluminum oxide from aluminum hydrate, 0.56 grams titanium dioxide and 0.40 grams molybdic oxide were thoroughly mixed in a Waring blender and calcined at 1750° F. for seven hours.

EXAMPLE 19

19.48 grams chrome oxide, 77.94 grams iron oxide, 1.12 grams of aluminum oxide from aluminum hydrate, 0.44 grams titanium dioxide and 0.40 grams molybdic oxide were thoroughly mixed in a Waring blender and calcined at 1900° F. for seven hours.

EXAMPLE 20

4.95 grams chrome oxide, 94.10 grams iron oxide, 0.28 grams of aluminum oxide from aluminum hydrate, 0.11 grams titanium dioxide and 0.40 grams molybdic oxide were thoroughly mixed in a Waring blender and calcined at 1900° F. for seven hours.

EXAMPLE 21

23.38 grams chrome oxide, 76.05 grams iron oxide, 0.24 grams of aluminum oxide from aluminum hydrate and 0.20 grams titanium dioxide were thoroughly mixed in a Waring blender and calcined at 1700° F. for four hours.

Table 3 below lists the Y CIE tri-stimulus values, x and y CIE chromaticity coordinates, and percent reflectance at various wavelengths in the near infrared spectrum for the solid solutions embodied in Examples 17 through 21 as compared to a standard red hematite pigment available as RO3097 from Harcross Pigments, Inc. of Easton, Penn. Y CIE tri-stimulus values and x and y CIE chromaticity coordinates were measured on neat pressed cup powder samples using a Diano Matchscan II Spectrophotometer using a 1931 CIE 2 degree observer with a C illuminant in accordance with the procedures set forth in ASTM Standard E308 (1996), Standard Practice for Computing the Colors of Objects by Using the CIE System, the text of which can be purchased from the American Society for Testing and Materials of West Conshohocken, Penn. Percent reflectance measurements were made on neat pressed cup powder samples using a Perkin Lambda 19 Spectrophotometer equipped with a Labsphere RSA-PE-19 reflectance spectroscopy accessory.

TABLE 3

Color and % IR Reflectance (Pressed Cups)

| Example | Y | x | y | 0.72 $\mu$m | 0.80 $\mu$m | 0.90 $\mu$m | 1.0 $\mu$m | 1.5 $\mu$m | 2.5 $\mu$m |
|---|---|---|---|---|---|---|---|---|---|
| Standard | 11.64 | .450 | .342 | 36.3 | 27.0 | 28.4 | 43.1 | 44.5 | 28.6 |
| 17 | 8.31 | .319 | .320 | 15.3 | 17.8 | 26.2 | 27.2 | 56.8 | 64.3 |
| 18 | 6.66 | .329 | .316 | 12.1 | 19.9 | 26.9 | 32.4 | 73.1 | 71.6 |
| 19 | 9.27 | .308 | .312 | 11.4 | 16.2 | 21.1 | 29.8 | 59.0 | 68.8 |
| 20 | 10.03 | .310 | .308 | 16.5 | 18.9 | 20.2 | 34.0 | 54.3 | 61.4 |
| 21 | 7.01 | .329 | .315 | 16.8 | 28.5 | 32.1 | 44.7 | 76.5 | 79.0 |

One of the primary uses for new solid solutions according to the present invention which exhibit relatively low Y CIE tri-stimulus values and relatively high near infrared reflectance would be as inorganic pigments in military camouflage paint or netting applications. By using these pigments in place of known pigments which contain cobalt, the radiation signature of a camouflage painted or covered object can be tailored to match the background in the visible and near infrared portions of the electromagnetic spectrum. Moreover, because many of these new solid solutions exhibit relatively high near infrared reflectance in a range of colors, they would also be suitable for use in the general paint and polymer markets, most specifically for architectural applications, such as vinyl siding, where increased near infrared reflectance would result in lower heat build-up and thus lower energy costs. Due to their high IR reflectivity, pigments according to the present invention are particularly useful in building material applications where heat reduction is desirable such as, for example, stucco, paint, vinyl siding, roofing tiles, roofing granules, roofing shingles, and brick.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A solid solution comprising a host component having the corundum-hematite crystalline structure, said host component comprising iron oxide, and a guest component, said guest component being incorporated into the crystalline lattice structure of said host component, said guest component comprising metal oxides or precursors thereof having as cations the elements aluminum, chrome, and titanium, said solid solution having a Y CIE tri-stimulus value below about 10 as measured on a neat pressed cup powder sample using a Diano Matchscan II Spectrophotometer using a 1931 CIE 2 degree observer with a C Illuminant in accordance with the procedures set forth in ASTM Standard E308 (1996), Standard Practice for Computing the Colors of Objects by Using the CIE System, and a reflectance above about 60% as measured on a neat pressed cup powder sample using a Perkin Lambda 19 Spectrophotometer equipped with a Labsphere RSA-PE-19 reflectance spectroscopy accessory at a wavelength of 2.5 $\mu$m.

2. The solid solution as in claim 1 wherein cations of the element iron comprise from about 45% to about 98% of the weight of all cations in the crystalline lattice, cations of the element chrome comprise from about 0.1% to about 43% of the weight of all cations in the crystalline lattice, cations of the element aluminum comprise from about 0.1% to about 15% of the weight of all cations in the crystalline lattice, and cations of the element titanium comprise from about 0.1% to about 10% of the weight of all cations in the crystalline lattice.

3. The solid solution as in claim 1 wherein cations of the element iron comprise from about 60% to about 95% of the weight of all cations in the crystalline lattice, cations of the element chrome comprise from about 2% to about 37% of the weight of all cations in the crystalline lattice, cations of the element aluminum comprise from about 0.1% to about 2% of the weight of all cations in the crystalline lattice, and cations of the element titanium comprise from about 0.1% to about 2% of the weight of all cations in the crystalline lattice.

4. The solid solution as in claim 1 wherein cations of the element iron comprise from about 70% to about 82% of the weight of all cations in the crystalline lattice, cations of the element chrome comprise from about 17% to about 29% of the weight of all cations in the crystalline lattice, cations of the element aluminum comprise from about 0.1% to about 0.5% of the weight of all cations in the crystalline lattice, and cations of the element titanium comprise from about 0.1% to about 0.5% of the weight of all cations in the crystalline lattice.

5. The solid solution as in claim 1 having a reflectance above about 70% as measured on a neat pressed cup powder sample using a Perkin Lambda 19 Spectrophotometer equipped with a Labsphere RSA-PE-19 reflectance spectroscopy accessory at a wavelength of 2.5 $\mu$m.

6. The solid solution as in claim 1 wherein said guest component further comprises a metal oxide or precursor thereof having as a cation the element molybdenum.

7. The solid solution as in claim 6 wherein cations of the element iron comprise from about 45% to about 98% of the weight of all cations in the crystalline lattice, cations of the element chrome comprise from about 0.1% to about 43% of the weight of all cations in the crystalline lattice, cations of the element aluminum comprise from about 0.1% to about 15% of the weight of all cations in the crystalline lattice, cations of the element molybdenum comprise from about 0.1% to about 10% of the weight of all cations in the crystalline lattice, and cations of the element titanium comprise from about 0.1% to about 10% of the weight of all cations in the crystalline lattice.

8. The solid solution as in claim 6 wherein cations of the element iron comprise from about 60% to about 95% of the weight of all cations in the crystalline lattice, cations of the element chrome comprise from about 2% to about 37% of the weight of all cations in the crystalline lattice, cations of the element aluminum comprise from about 0.1% to about 2% of the weight of all cations in the crystalline lattice, cations of the element molybdenum comprise from about 0.1% to about 2% of the weight of all cations in the crystalline lattice, and cations of the element titanium comprise from about 0.1% to about 2% of the weight of all cations in the crystalline lattice.

9. The solid solution as in claim 6 wherein cations of the element iron comprise from about 55% to about 69% of the weight of all cations in the crystalline lattice, cations of the element chrome comprise from about 30% to about 42% of the weight of all cations in the crystalline lattice, cations of the element aluminum comprise from about 0.1% to about 2% of the weight of all cations in the crystalline lattice, cations of the element molybdenum comprise from about 0.1% to about 1% of the weight of all cations in the crystalline lattice, and cations of the element titanium comprise from about 0.1% to about 1% of the weight of all cations in the crystalline lattice.

10. The solid solution as in claim 6 wherein cations of the element iron comprise from about 58% to about 72% of the weight of all cations in the crystalline lattice, cations of the element chrome comprise from about 26% to about 38% of the weight of all cations in the crystalline lattice, cations of the element aluminum comprise from about 0.1% to about 2% of the weight of all cations in the crystalline lattice, cations of the element molybdenum comprise from about 0.1% to about 1% of the weight of all cations in the crystalline lattice, and cations of the element titanium comprise from about 0.1% to about 1% of the weight of all cations in the crystalline lattice.

11. The solid solution as in claim 6 wherein cations of the element iron comprise from about 72% to about 86% of the weight of all cations in the crystalline lattice, cations of the element chrome comprise from about 13% to about 25% of the weight of all cations in the crystalline lattice, cations of the element aluminum comprise from about 0.1% to about 2% of the weight of all cations in the crystalline lattice, cations of the element molybdenum comprise from about 0.1% to about 1% of the weight of all cations in the crystalline lattice, and cations of the element titanium comprise from about 0.1% to about 1% of the weight of all cations in the crystalline lattice.

12. The solid solution as in claim 6 wherein cations of the element iron comprise from about 87% to about 98% of the weight of all cations in the crystalline lattice, cations of the element chrome comprise from about 2% to about 10% of the weight of all cations in the crystalline lattice, cations of the element aluminum comprise from about 0.1% to about 2% of the weight of all cations in the crystalline lattice, cations of the element molybdenum comprise from about 0.1% to about 1% of the weight of all cations in the crystalline lattice, and cations of the element titanium comprise from about 0.1% to about 1% of the weight of all cations in the crystalline lattice.

13. The solid solution as in claim 6 having a reflectance above about 70% as measured on a neat pressed cup powder sample using a Perkin Lambda 19 Spectrophotometer equipped with a Labsphere RSA-PE-19 reflectance spectroscopy accessory at a wavelength of 2.5 $\mu$m.

14. A pigment comprising a solid solution having the corundum-hematite crystalline structure, said pigment having a Y CIE tri-stimulus value below about 10 as measured on a neat pressed cup powder sample using a Diano Matchscan II Spectrophotometer using a 1931 CIE 2 degree observer with a C Illuminant in accordance with the procedures set forth in ASTM Standard E308 (1996), Standard Practice for Computing the Colors of Objects by Using the CIE System, and a reflectance above about 60% as measured on a neat pressed cup powder sample using a Perkin Lambda 19 Spectrophotometer equipped with a Labsphere RSA-PE-19 reflectance spectroscopy accessory at a wavelength of 2.5 $\mu$m.

15. The pigment as in claim 14 having a reflectance above about 70% as measured on a neat pressed cup powder sample using a Perkin Lambda 19 Spectrophotometer equipped with a Labsphere RSA-PE-19 reflectance spectroscopy accessory at a wavelength of 2.5 $\mu$m.

16. The pigment as in claim 14 wherein said solid solution comprises a host component and at least one guest component incorporated into the crystalline lattice structure of said host component, said host component comprising iron oxide.

17. The pigment as in claim 16 wherein said guest component comprises one or more metal oxides or precursors thereof having as cations elements selected from the group consisting of aluminum, antimony, bismuth, boron, chrome, cobalt, gallium, indium, lanthanum, lithium, magnesium, manganese, molybdenum, neodymium, nickel, niobium, silicon, tin, titanium, vanadium, and zinc.

18. A building material that contains a pigment comprising a solid solution having the corundum-hematite crystalline structure, said pigment having a Y CIE tri-stimulus value below about 10 as measured on a neat pressed cup powder sample using a Diano Matchscan II Spectrophotometer using a 1931 CIE 2 degree observer with a C Illuminant in accordance with the procedures set forth in ASTM Standard E308 (1996), Standard Practice for Computing the Colors of Objects by Using the CIE System, and a reflectance above about 60% as measured on a neat pressed cup powder sample using a Perkin Lambda 19 Spectrophotometer equipped with a Labsphere RSA-PE-19 reflectance spectroscopy accessory at a wavelength of 2.54 µm.

19. The building material as in claim 18 comprising stucco.

20. The building material as in claim 18 comprising roofing tile.

21. The building material as in claim 18 comprising roofing granules.

22. The building material as in claim 18 comprising roofing shingles.

23. The building material as in claim 18 comprising brick.

* * * * *